United States Patent
Bedi et al.

(10) Patent No.: US 11,288,383 B2
(45) Date of Patent: *Mar. 29, 2022

(54) ACCESS CONTROL TOOL

(71) Applicant: Bank of America Corporation, Charlotte, NC (US)

(72) Inventors: Kamaljeet Singh Bedi, New Delhi (IN); David Lee Hoyle, Gilbert, AZ (US); Jyotiranjan Mohapatra, Telengana (IN); Vishal Patangia, West Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/938,100

(22) Filed: Jul. 24, 2020

(65) Prior Publication Data

US 2020/0356683 A1  Nov. 12, 2020

Related U.S. Application Data

(63) Continuation of application No. 16/004,678, filed on Jun. 11, 2018, now Pat. No. 10,762,220.

(51) Int. Cl.
*G06F 21/60* (2013.01)
*H04L 29/06* (2006.01)

(52) U.S. Cl.
CPC .......... *G06F 21/604* (2013.01); *H04L 63/102* (2013.01); *H04L 63/107* (2013.01)

(58) Field of Classification Search
CPC .... G06F 21/604; H04L 63/102; H04L 63/107
USPC .......................................................... 726/1
See application file for complete search history.

(56) References Cited

U.S. PATENT DOCUMENTS

| | | | |
|---|---|---|---|
| 8,438,654 B1 | 5/2013 | von Eicken et al. | |
| 9,148,429 B2 | 9/2015 | Cairns et al. | |
| 9,426,182 B1 | 8/2016 | Zeljko et al. | |
| 9,691,051 B2 | 6/2017 | Rexer et al. | |
| 9,716,692 B2 | 7/2017 | Cismas et al. | |
| 10,623,380 B1 | 4/2020 | Pratt et al. | |
| 2007/0209061 A1 | 9/2007 | Dekeyzer et al. | |
| 2014/0082071 A1* | 3/2014 | Rexer ................. | G06F 21/6245 709/204 |
| 2015/0295947 A1 | 10/2015 | Saad | |
| 2018/0287802 A1 | 10/2018 | Brickell | |
| 2019/0377887 A1 | 12/2019 | Bedi et al. | |

\* cited by examiner

*Primary Examiner* — Jacob Lipman (57) ABSTRACT

An apparatus includes a memory and a hardware processor. The memory stores security restrictions. The processor detects that a user attempted to access a third-party application that does not use the stored security restrictions and communicates the stored security restrictions to the third-party application. The processor also receives a message indicating that the third-party application registered the security restrictions, determines, based on the stored security restrictions, that the user should be granted access to the third-party application, and in response to the determination that the user should be granted access to the third-party application, redirects the user to the third-party application.

20 Claims, 4 Drawing Sheets

ACCESS CONTROL TOOL

CROSS-REFERENCE TO RELATED APPLICATIONS

This application is a continuation of U.S. patent application Ser. No. 16/004,678 filed Jun. 11, 2018, by Kamaljeet Singh Bedi et al., and entitled "ACCESS CONTROL TOOL," which is incorporated herein by reference.

TECHNICAL FIELD

This disclosure relates generally to access control and security.

BACKGROUND

Computers are used ubiquitously throughout organizations by members and employees to execute software. In some instances, the software is an external, third-party application that is outside the control of the organization.

SUMMARY OF THE DISCLOSURE

Computers are used ubiquitously throughout organizations by members and employees to execute software. In many instances, users in the organization use their devices to access software (e.g., applications) internal to the organization. The users provide authentication credentials and internal security restrictions are applied to the users' access to the software. Thus, the organizations are able to control their users' access and use of the internal software.

In some instances, however, users may access and use software that is external to the organization. For example, the users may try to access or use third-party applications through the organizations' networks. These third-party applications may not use the same (if any) security restrictions that the organizations use, and these third-party applications may not monitor or control the users the same way that the organizations do. As a result, use of the third-party applications may pose security risks and threats (e.g., data breaches, thefts, hacks, etc.) that are uncontrollable by the organizations.

This disclosure contemplates an access control tool that allows an organization to control access and use of third-party applications. The access control tool establishes an access control protocol with a third-party application so that the third-party application can apply the organization's security restrictions to the organization's users. When a user attempts to access the third-party application, the access control tool first verifies the user against the organization's security restrictions and then redirects the user to the third-party application. If the user attempts to access the third-party application directly, the third-party application will redirect the user to the access control tool per the access control protocol. In this manner, the access control tool makes it more difficult for the organization's security restrictions to be bypassed in certain instances. Three embodiments are described below.

According to an embodiment, an apparatus includes a memory and a hardware processor. The memory stores security restrictions. The processor detects that a user attempted to access a third-party application that does not use the stored security restrictions and communicates the stored security restrictions to the third-party application. The processor also receives a message indicating that the third-party application registered the security restrictions, determines, based on the stored security restrictions, that the user should be granted access to the third-party application, and in response to the determination that the user should be granted access to the third-party application, redirects the user to the third-party application.

According to another embodiment, a method includes storing, by a memory, security restrictions and detecting, by a hardware processor communicatively coupled to the memory, that a user attempted to access a third-party application that does not use the stored security restrictions. The method also includes communicating, by the hardware processor, the stored security restrictions to the third-party application and receiving, by the hardware processor, a message indicating that the third-party application registered the security restrictions. The method further includes determining, by the hardware processor, based on the stored security restrictions, that the user should be granted access to the third-party application and in response to the determination that the user should be granted access to the third-party application, redirecting, by the hardware processor, the user to the third-party application.

According to yet another embodiment, a system includes a third-party application and an access control tool. The access control tool stores, by a memory, security restrictions and detects, by a hardware processor communicatively coupled to the memory, that a user attempted to access a third-party application that does not use the stored security restrictions. The access control tool also communicates, by the hardware processor, the stored security restrictions to the third-party application and receives, by the hardware processor, a message indicating that the third-party application registered the security restrictions. The access control tool further determines, by the hardware processor, based on the stored security restrictions, that the user should be granted access to the third-party application and in response to the determination that the user should be granted access to the third-party application, redirects, by the hardware processor, the user to the third-party application.

Certain embodiments provide one or more technical advantages. For example, an embodiment improves the security of an organization by allowing the organization's security restrictions to be enforced by a third-party application. As another example, an embodiment improves an organization's security by reducing the chances that the organization's security restrictions are bypassed or avoided. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Computers are used ubiquitously throughout organizations by members and employees to execute software. In many instances, users in the organization use their devices to access software (e.g., applications) internal to the organization. The users provide authentication credentials and internal security restrictions are applied to the users' access to the software. For example, the security restrictions may limit access to the application based on a user's role in the organization or the level of security software present on the user's device. As another example, the security restrictions may limit when (e.g., time of day restrictions) or from where (e.g., geographic restrictions) a user may access the application. Thus, the organizations are able to control their users' access and use of the internal software.

In some instances, however, users may access and use software that is external to the organization. For example, the users may try to access or use third-party applications through the organizations' networks. These third-party applications may not use the same (if any) security restrictions that the organizations use, and these third-party applications may not monitor or control the users the same way that the organizations do. For example, many third-party applications are accessible through a standard Internet connection and require only that a username and password be supplied. These applications do not verify a user's role, geographic location, or access privileges based on time of day or setting. As a result, use of the third-party applications may pose security risks and threats (e.g., data breaches, thefts, hacks, etc.) that are uncontrollable by the organizations.

This disclosure contemplates an access control tool that allows an organization to control access and use of third-party applications. The access control tool establishes an access control protocol with a third-party application so that the third-party application can apply the organization's security restrictions to the organization's users. When a user attempts to access the third-party application, the access control tool first verifies the user against the organization's security restrictions and then redirects the user to the third-party application. If the user attempts to access the third-party application directly, the third-party application will redirect the user to the access control tool per the access control protocol. In this manner, the access control tool makes it more difficult for the organization's security restrictions to be bypassed in certain instances. The access control tool will be described in more detail using FIGS. 1 through 4.

Figure 1:
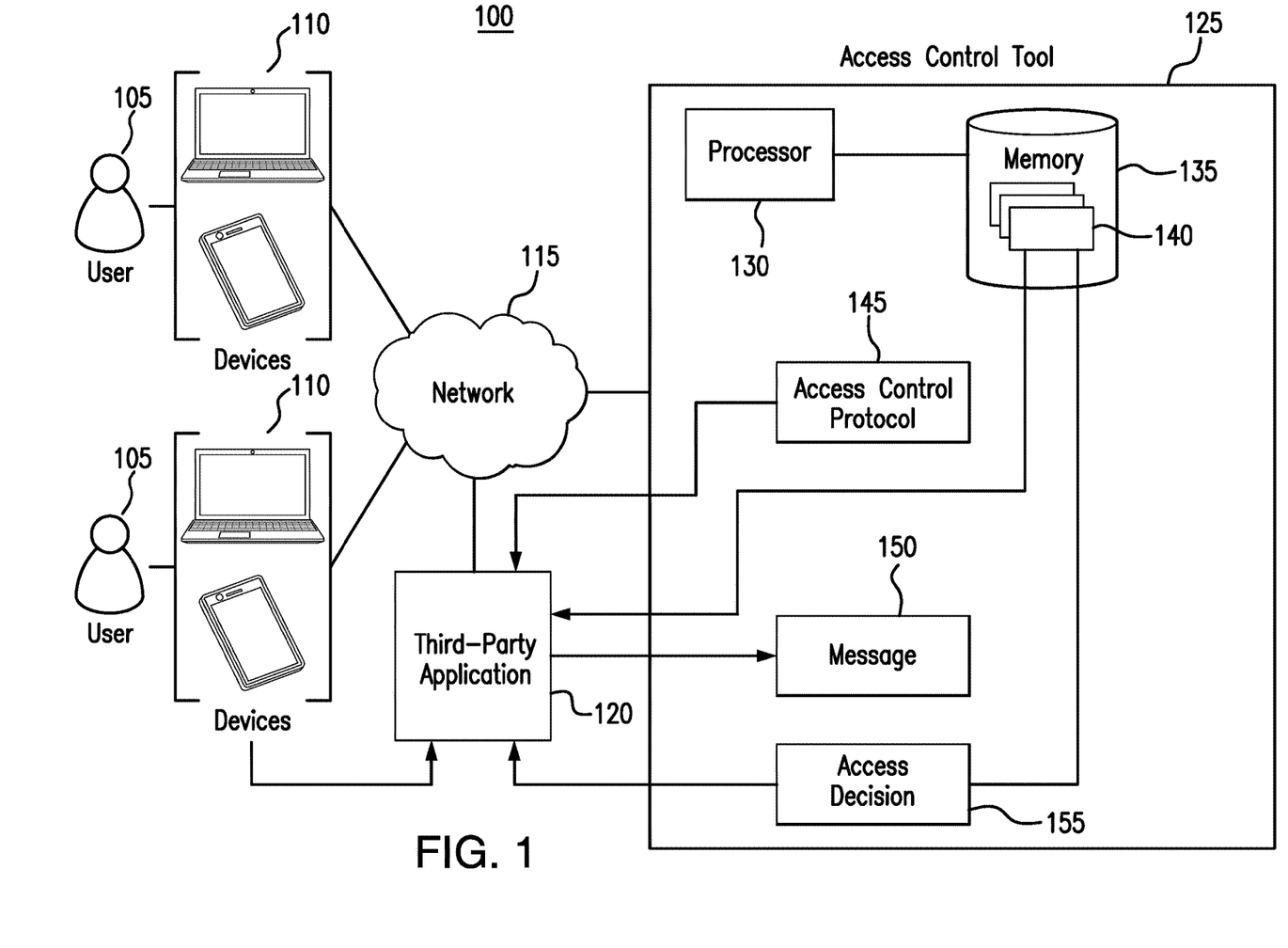
FIG. 1 illustrates an example access control system.

FIG. 1 illustrates an example access control system 100. As shown in FIG. 1, system 100 includes one or more devices 110, a network 115, a third-party application 120, and an access control tool 125. In certain embodiments, system 100 uses access control tool 125 to control and or limit access to third-party application 120, which improves the security of system 100

Users 105 uses devices 110 to access various components of system 100 such as, for example, third-party application 120 and or access control tool 125. Devices 110 provide credentials for user 105 to access these components. For example, devices 110 may provide a username and/or a password of user 105 to third-party application 120 or access control tool 125. Based on these credentials, access may be given to user 105.

User 105 and devices 110 may be part of an organization such as a business. A business may have internal applications that are accessible by user 105 using device 110. For internal applications, the organization can control and limit access to the application. For example, a business can limit a user's access to an internal application by limiting access to certain times of day or by limiting access to users who are in specific geographic locations such as an office building. The organization can also change or limit access by a user based on the user's role in the organization, for example, a high-level user can be given access to every feature of an application, but a low-level user can be restricted to only a few features of the application.

Devices 110 include any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Third-party application 120 is an application that is external to a business or organization. The application 120 may be developed by another organization. In some embodiments third-party application 120 cannot access information that is internal to the organization, rather third-party application 120 applies its own security protocols and restrictions to users who attempt to access third-party application 120. When a user 105 attempts to access third-party application 120 from within an organization, the third-party application 120 may not be able to apply the organization's security restrictions on user 105 because third-party application 120 does not know the organization's security restrictions or protocols. Rather third-party 120 application applies its own security restrictions and protocols on user 105 which may be less onerous than the organization's security restrictions and protocols. As a result, access to third-party application 120 may expose the organization and network 115 to various security risks and/or threats such as, for example, data breaches, thefts and hacks.

In existing organizations, the remedy to the security issues posed by third-party application 120 is simply to prevent access to third-party application 120 altogether. However, in some instances, third-party application 120 may be important or vital to the efficient operation of the organization. As a result, it may be desirable to allow users 105 to access third-party application 120 but apply the organization's security protocols and restrictions on such access.

Access control tool 125 allows an organization to have its security restrictions and protocols applied when a third-party application 120 is used. As shown in FIG. 1, access control tool 125 includes a processor 130 and a memory 135. This disclosure contemplates processor 130 and memory 135 being configured to perform any of the operations of access control tool 125 described herein. In certain embodiments, access control tool 125 improves the security of an organization by applying the organization's security protocols and restrictions when accessing third-party application 120.

Processor 130 is any electronic circuitry, including, but not limited to microprocessors, application specific integrated circuits (ASIC), application specific instruction set processor (ASIP), and/or state machines, that communicatively couples to memory 135 and controls the operation of access control tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of access control tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Access control tool 125 stores security restrictions 140 in memory 135. Security restrictions 140 indicate the restrictions on a particular user 105. For example, security restrictions 140 may indicate a time-of-day restriction on a user 105. As another example, security restrictions 140 may indicate a geographic restriction on user 105. As yet another example, security restrictions 140 may indicate certain applications to which user 105 should not be given access. In some embodiments, a user 105 may have one or more of these security restrictions 140 applied to that user 105. As an example, a user 105 may be restricted such that the user 105 is only allowed to access certain applications during business hours and at the business office. As yet another example, another user 105 may be given access to certain internal applications during work hours. That user 105 may be allowed to access these applications both at the office and at home. As yet another example, a high-level user 105 in the organization may be allowed to access any application from any geographic location and at any time of the day.

When user 105 accesses third-party application 120, third-party application 120 may not be able to apply security restrictions 140 to the user's 105 access. In some situations, third-party application 120 may not even know what security restrictions 140 are, or which security restrictions 140 should be applied to user 105. As a result, when a user 105 accesses third-party application 120, the user 105 may expose the organization and network 115 to various security threats and/or risks. For example, user 105 may open a backdoor through which data breaches and/or hacks can occur.

Access control tool 125 allows third-party application 120 to apply security restrictions 140 on a user's 105 access. Access control tool 125 communicates an access control protocol 145 to third-party application 120. Access control protocol 145 instructs third-party application 120 on when and how to apply security restrictions 140. Access control protocol 145 also instructs third-party application 120 on what to do when a user 105 attempts to access third-party application 120. Third-party application 120 follows or abides by access control protocol 145 to improve the security of system 100.

Access control tool 125 also communicates security restrictions 140 to third-party application 120. Third-party application 120 receives security restrictions 140 and third-party application 120 can then analyze and apply security restrictions 140 to a user 105 that attempts to access third-party application 120. Third-party application 120 can register security restrictions 140 with its own internal servers and/or processors so that third-party application 120 can apply security restrictions 140 in the future. When third-party application 120 has registered security restrictions 140 and/or access control protocol 145, third-party application 120 communicates a message 150 to access control tool 125. Message 150 indicates to access control tool 125 that third-party application 120 has registered security restrictions 140 and/or access control protocol 145.

When a user 105 attempts to access third-party application 120, third-party application 120 may redirect the user 105 to access control tool 125 per the terms of access control protocol 145. Access control tool 125 then applies security restrictions 140 to user 105. For example, access control tool 125 may determine whether user 105 has provided the proper internal credentials to the organization. If user 105 has provided the proper credentials, then access control tool 125 may consider user 105 as authenticated. As another example access control tool 125 may apply security restrictions 140 to determine whether user 105 is allowed to access an application at the current time and at the current location of user 105. Access control tool 125 makes an access decision 155 based on security restrictions 140. If access control tool 125 determines that user 105 is allowed to access third-party application 120 based on security restrictions 140, access control tool may make an access decision 155 that user 105 should be granted access to third-party application 120. On the other hand, if access control tool 125 determines, based on security restrictions 140, that user 105 should not be given access to third-party application 120, then access control tool 125 can generate access decision 155 that denies access to user 105. If access is granted, access control tool 125 redirects user 105 to third-party application 120. In this manner, access control tool 125 allows security restrictions 140 to be applied to a user's 105 access to an external third-party application 120, which improves the security of system 100 in certain embodiments.

Figure 2:
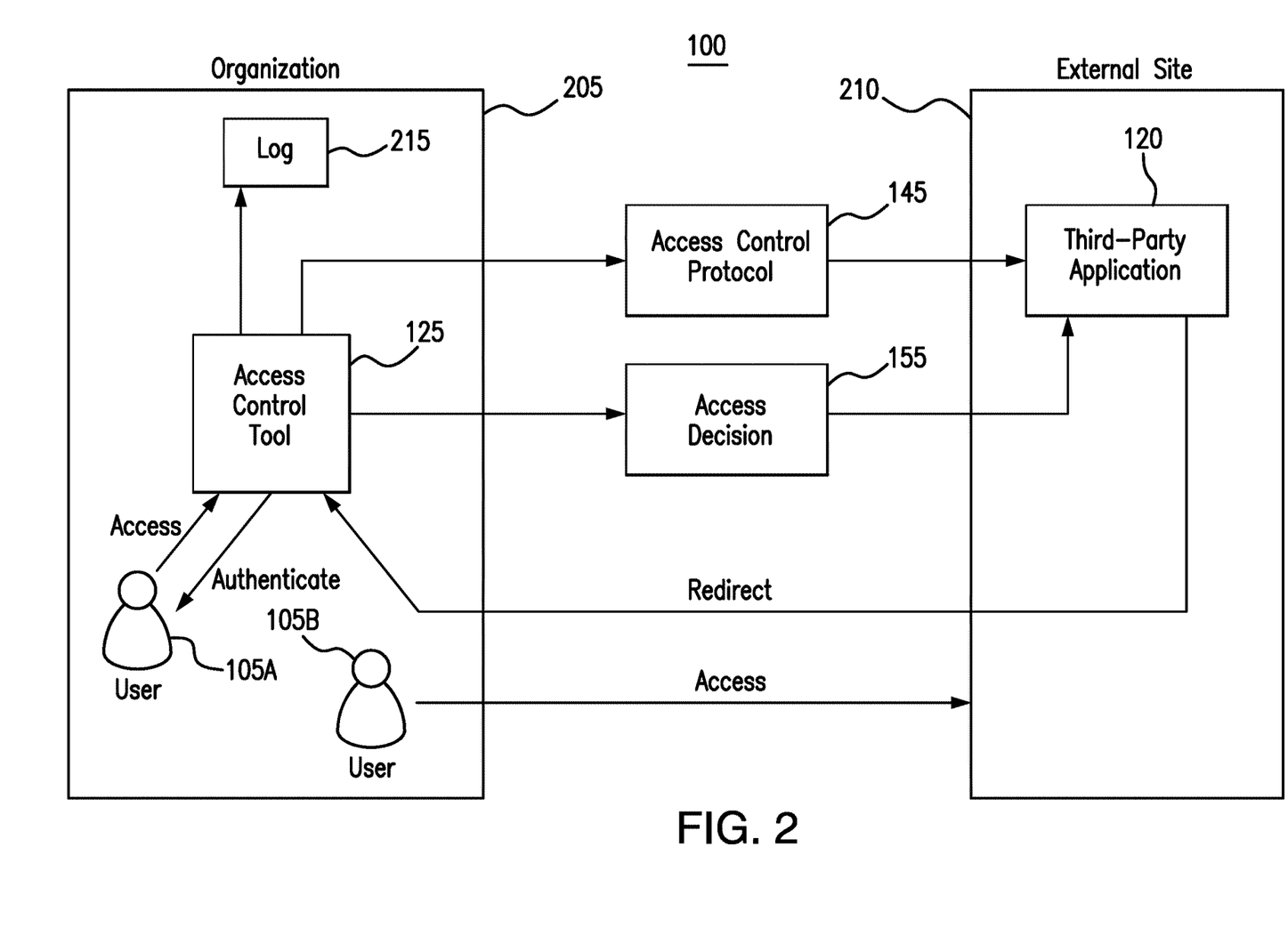
FIG. 2 illustrates portions of the example system of FIG. 1.

FIG. 2 illustrates portions of the example system 100 of FIG. 1. As shown in FIG. 2, system 100 includes an organization 205 and an external site 210. In particular embodiments, access control tool 125 of organization 205 allows the security restrictions of organization 205 to be applied by external site 210 which improves the security of organization 205.

Organization 205 includes access control tool 125. In general, access control tool 125 controls or allows external site 210 to control a user's 105 access to external site 210 by applying organization's 205 security restriction. Organization 205 includes two users, 105A and 105B. User 105A attempts to access third-party application 120 through access control tool 125. In contrast, user 105B attempts to access third-party application 120 directly.

Access control tool 125 communicates access control protocol 145 to third-party application 120. Access control protocol 145 includes instructions for how and when the security restrictions of access control tool 125 should be applied by third-party application 120 or external site 210. For example, access control protocol 145 may instruct third-party application 120 to redirect users 105 that attempt to access third-party application 120 directly to access control tool 125. As another example, access control protocol 145 may indicate the times of the day when third-party application 120 should apply the security restrictions of organizations 205. As yet another example, access control protocol 145 may indicate the geographic locations from which connection request should be accepted by third-party application 120. In certain embodiments by communicating access control protocol 145 to third-party application 120, third-party application 120 is allowed to register access control protocol 145 or security restrictions of organization 205 with access control tool 125.

User 105A may request access to third-party application 120 through access control tool 125. Access control tool 125 detects that user 105A is attempting to access third-party application 120 when access control tool 125 receives an access request from user 105A. In response access control tool 125 may request that user 105A authenticate himself to access control tool 125. User 105A can provide access control tool 125 any credential of user 105A. For example, user 105A may provide a username, a password, and or a security key that is internal to organization 205. Based on those credentials, access control tool 125 may determine whether user 105A has authenticated himself per the standards of organization 205. If user 105A did not authenticate himself properly, access control tool 125 can deny user 105A access to third-party application 120. If user 105A authenticated himself properly, access control tool 105 may redirect user 105A to external site 210 and or third-party application 120.

Access control tool 125 generates an access decision 155 and communicates access decision 155 to third-party application 120. Access decision 155 may indicate whether a user 105 has been granted or denied access to third-party application 120. For example, if user 105A has authenticated himself properly to access control tool 125, access control tool 125 may communicate access decision 155 to third-party application 120 indicating that user 105A should be granted access to third-party application 120. Access control tool 125 may also redirect user 105A to third-party application 120.

When user 105B attempts to access external site 210 or third-party application 120 directly, third-party application 120 may detect that user 105B is attempting access. In response and based on access control protocol 145, third-party application 120 may redirect user 105B to access control tool 125. In this manner, user 105B is prevented from directly accessing third-party application 120. As a result, user 105B is required to perform any authorization or security check imposed by organization 205. User 105B is not allowed to bypass or avoid the security restriction of organization 205 by directly accessing third-party application 120.

After user 105B is redirected to access control tool 125, user 105B may fail to authenticate himself properly or access control tool 125 may determine, based on stored security restrictions, that user 105B is not allowed to access third-party application 120. For example, access control tool 125 may determine that user 105B does not have a role in organization 205 that should be given access to third-party application 120. As another example access control tool 125 may determine that user 105B should not be given access to third-party application 120 during a time of day when access was requested and/or attempted. As yet another example, access control tool 125 may determine that user 105B is in a certain geographic location (e.g. a home) from which user 105B should not be given access to third-party application 120. In response to any of these determination access control tool 125 may deny user 105B access to third-party application 120. Access control tool 125 may generate access decision 155 that denies access to user 105B.

In certain embodiments, after a user 105 is granted access to third-party application 120, access control tool 125 redirects user 105 to the third-party application 120. As a result, user 105 has a session established with third-party application 120. However, third-party application 120 can still apply the security restrictions of organization 205 to the session between user 105 and third-party application 120. In this manner, the organization's 205 security restrictions are applied to the session between user 105 and third-party application 120.

In certain embodiments, organization 205 includes a log 215. Access control tool 125 maintain log 215 by adding entries indicating when and from where a user 105 attempted access to third-party application 120. Log 215 may also include entries for when that access was granted or denied. In some embodiments, access control tool 125 may further include details of how user 105 used third-party application 120. In this manner, log 215 may be inspected in the future to determine which users 105 had accessed third-party application 120 and what those users 105 did while accessing third-party application 120.

Figure 3:
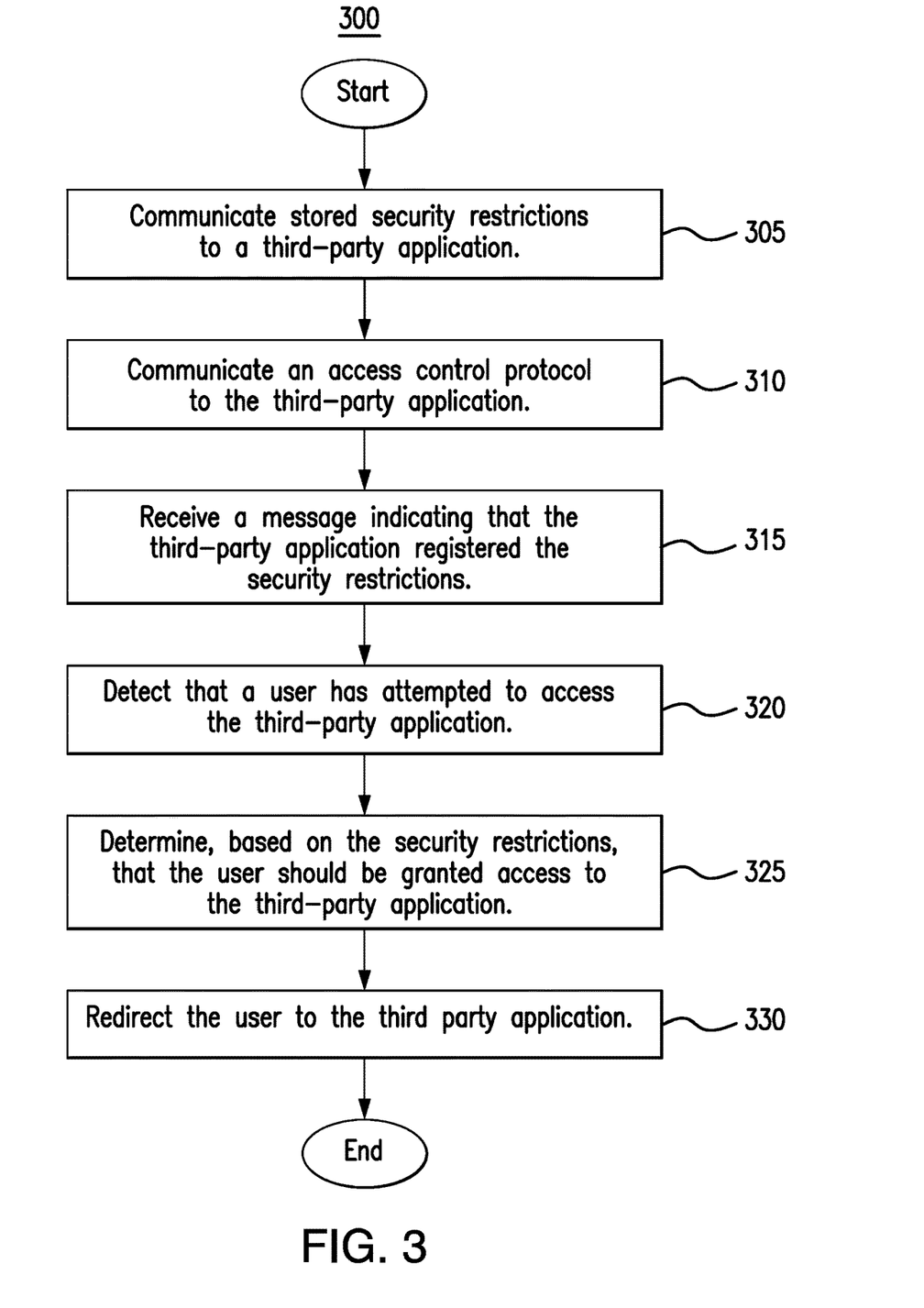
FIG. 3 is a flowchart illustrating a method for controlling access using the system of FIG. 1.
Figure 4:
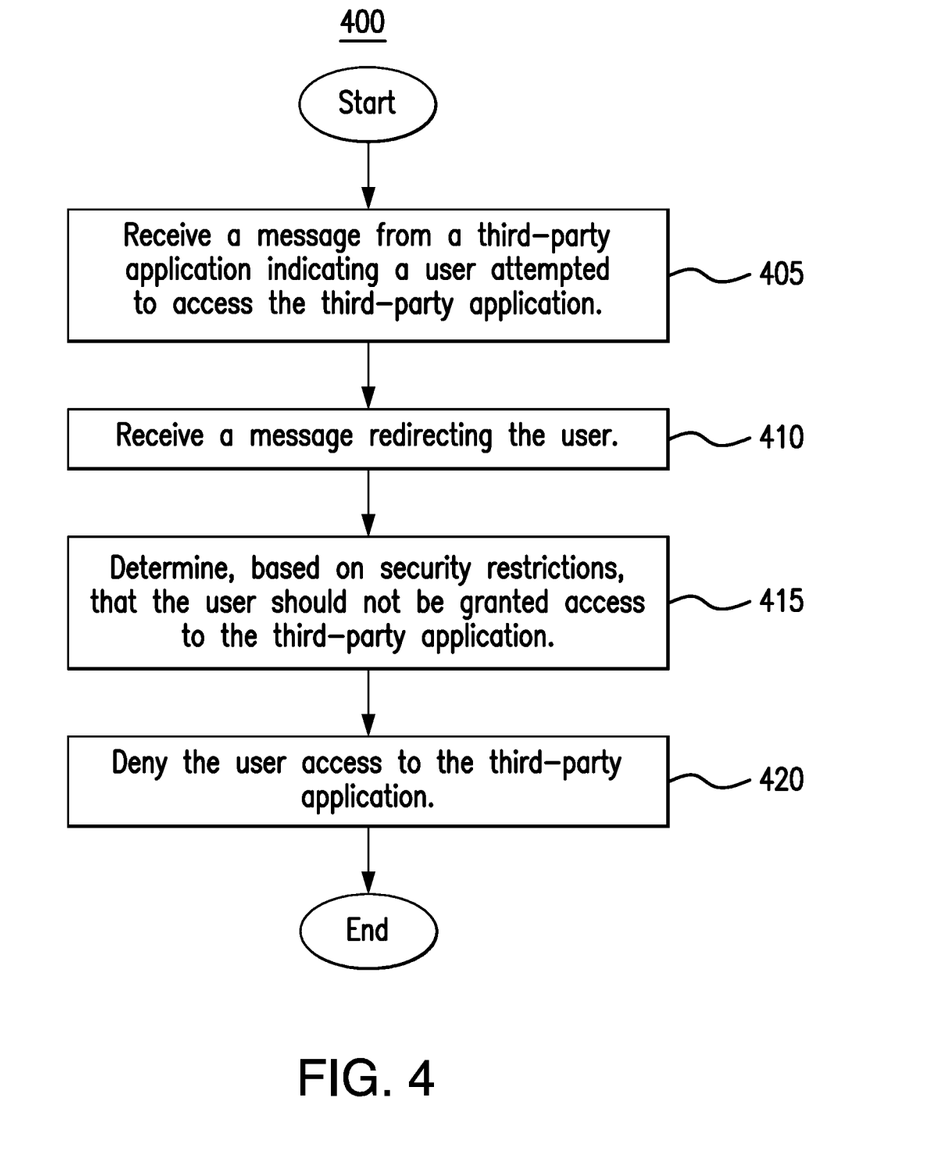
FIG. 4 is a flowchart illustrating a method for controlling access using the system of FIG. 1.

FIGS. 3 and 4 describe different processes that can be performed to improve the security of an organization and/or its network. In some embodiments, access control tool 125 performs these processes. Generally, access control tool 125 prevents a user from accessing a third-party application unless the user clears the internal security restrictions of an organization.

FIG. 3 is a flow chart illustrating a method 300 for controlling access using the system 100 of FIG. 1. In certain embodiments, access control tool 125 performs method 300. By performing method 300, access control tool 125 improves the security of an organization by ensuring that the security restrictions of the organization are enforced while accessing an external, third-party application.

Access control tool 125 begins by communicating stored security restrictions to a third-party application in step 305.

Access control tool 125 then communicates an access control protocol to third-party application in step 310. After receiving the security restrictions and the access control protocol, the third-party application may register the access control protocol and/or the security restriction.

In step 315, access control tool 125 receives a message indicating that the third-party application registered the security restriction. In some embodiments, the message may also indicate that the third-party application has registered with the access control protocol. In step 320, access control tool 125 detects that a user has attempted to access the third-party application. Access control tool 125 then determines, based on the security restrictions, that the user should be granted access to the third-party application in step 325. Based on the determination, access control tool 125 redirects the users to third-party application in step 330.

FIG. 4 is a flow chart illustrating a method 400 for controlling access using the system 100 of FIG. 1. In certain embodiments, access control tool 125 performs method 400. By performing method 400, access control tool 125 may ensure that the security restrictions of an organization are not bypassed and/or avoided.

Access control tool 125 begins by receiving a message from a third-party application that indicates that a user attempted to access the third-party application in step 405. The user may have attempted to access the third-party application directly. In step 410, access control tool 125 receives a message redirecting the user. The third-party application may have redirected the user based on a registered access control protocol. By redirecting the user, the user is prevented from directly accessing the third-party application.

In step 415, access control tool 125 determines, based on security restrictions, that the user should not be granted access to the third-party application. Access control tool 125 then denies the user access to the third-party application in step 420. For example, access control tool 125 may determine that the user is not in an appropriate geographic location from which access to third-party application should be granted. As another example, access control tool 125 may determine that the user should not be allowed to access the third-party application during the particular time of day when access was requested.

Modifications, additions, or omissions may be made to methods 300 and 400 depicted in FIGS. 3 and 4. Methods 300 and 400 may include more, fewer, or other steps. For example, steps may be performed in parallel or in any suitable order. While discussed as access control tool 125 (or components thereof) performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store security restrictions; and
a hardware processor communicatively coupled to the memory, the hardware processor configured to:
   detect that a user attempted to access, through a user device, a third-party application that does not apply the stored security restrictions to the user's access to the third-party application;
   in response to detecting the user's attempted access, communicate the stored security restrictions and an access control protocol to the third-party application rather than the user device, the access control protocol indicating that access to the third-party application should not be granted without clearing the security restrictions;
   receive a message indicating that the third-party application registered the security restrictions indicating that the third-party application will apply the security restrictions to the user's access to the third-party application;
   determine, based on the stored security restrictions, that the user should be granted access to the third-party application; and
   in response to the determination that the user should be granted access to the third-party application, redirect the user to the third-party application.

2. The apparatus of claim 1, wherein the hardware processor is further configured to:
   receive a message from the third-party application redirecting a second user who attempted to access the third-party application, the message generated based on the access control protocol;
   determine, based on the stored security restrictions, that the second user should not be granted access to the third-party application; and
   in response to the determination that the second user should not be granted access to the third-party application, deny the second user access to the third-party application.

3. The apparatus of claim 1, wherein the security restrictions indicate that the user should be granted access based on the user's geographic location, the third-party application limiting the user's access to the third-party application based on the user's geographic location.

4. The apparatus of claim 1, wherein the determination that the user should be granted access to the third-party application is further based on whether the hardware processor authenticated the user.

5. The apparatus of claim 1, wherein the hardware processor is further configured to:
   determine that a second user attempted to access the third-party application;
   determine, based on the stored security restrictions, that the second user should not be granted access to the third-party application; and
   in response to the determination that the second user should not be granted access to the third-party application, deny the second user access to the third-party application.

6. The apparatus of claim 1, wherein the stored security restrictions are applied to the user's session with the third-party application.

7. The apparatus of claim 1, the hardware processor further configured to log a date and a time when the user accessed the third-party application.

8. A method comprising:
storing, by a memory, security restrictions;
detecting, by a hardware processor communicatively coupled to the memory, that a user attempted to access, through a user device, a third-party application that does not apply the stored security restrictions to the user's access to the third-party application;
in response to detecting the user's attempted access, communicating, by the hardware processor, the stored security restrictions and an access control protocol to the third-party application rather than the user device, the access control protocol indicating that access to the third-party application should not be granted without clearing the security restrictions;

receiving, by the hardware processor, a message indicating that the third-party application registered the security restrictions indicating that the third-party application will apply the security restrictions to the user's access to the third-party application;

determining, by the hardware processor, based on the stored security restrictions, that the user should be granted access to the third-party application; and in response to the determination that the user should be granted access to the third-party application, redirecting, by the hardware processor, the user to the third-party application.

9. The method of claim 8, further comprising:

receiving, by the hardware processor, a message from the third-party application redirecting a second user who attempted to access the third-party application, the message generated based on the access control protocol;

determining, by the hardware processor, based on the stored security restrictions, that the second user should not be granted access to the third-party application; and in response to the determination that the second user should not be granted access to the third-party application, denying, by the hardware processor, the second user access to the third-party application.

10. The method of claim 8, wherein the security restrictions indicate that the user should be granted access based on the user's geographic location, the third-party application limiting the user's access to the third-party application based on the user's geographic location.

11. The method of claim 8, wherein the determination that the user should be granted access to the third-party application is further based on whether the hardware processor authenticated the user.

12. The method of claim 8, further comprising:

determining, by the hardware processor, that a second user attempted to access the third-party application;

determining, by the hardware processor, based on the stored security restrictions, that the second user should not be granted access to the third-party application; and in response to the determination that the second user should not be granted access to the third-party application, denying, by the hardware processor, the second user access to the third-party application.

13. The method of claim 8, wherein the stored security restrictions are applied to the user's session with the third-party application.

14. The method of claim 8, further comprising logging, by the hardware processor, a date and a time when the user accessed the third-party application.

15. A system comprising:

a third-party application; and an access control tool configured to:

store, by a memory, security restrictions;

detect, by a hardware processor communicatively coupled to the memory, that a user attempted to access, through a user device, the third-party application that does not apply the stored security restrictions to the user's access to the third-party application;

in response to detecting the user's attempted access, communicate, by the hardware processor, the stored security restrictions and an access control protocol to the third-party application rather than the user device, the access control protocol indicating that access to the third-party application should not be granted without clearing the security restrictions;

receive, by the hardware processor, a message indicating that the third-party application registered the security restrictions indicating that the third-party application will apply the security restrictions to the user's access to the third-party application;

determine, by the hardware processor, based on the stored security restrictions, that the user should be granted access to the third-party application; and in response to the determination that the user should be granted access to the third-party application, redirect, by the hardware processor, the user to the third-party application.

16. The system of claim 15, wherein the access control tool is further configured to:

receive, by the hardware processor, a message from the third-party application redirecting a second user who attempted to access the third-party application, the message generated based on the access control protocol;

determine, by the hardware processor, based on the stored security restrictions, that the second user should not be granted access to the third-party application; and in response to the determination that the second user should not be granted access to the third-party application, deny, by the hardware processor, the second user access to the third-party application.

17. The system of claim 15, wherein the security restrictions indicate that the user should be granted access based on the user's geographic location, the third-party application limiting the user's access to the third-party application based on the user's geographic location.

18. The system of claim 15, wherein the determination that the user should be granted access to the third-party application is further based on whether the access control tool authenticated the user.

19. The system of claim 15, wherein the access control tool is further configured to:

determine, by the hardware processor, that a second user attempted to access the third-party application;

determine, by the hardware processor, based on the stored security restrictions, that the second user should not be granted access to the third-party application; and in response to the determination that the second user should not be granted access to the third-party application, deny, by the hardware processor, the second user access to the third-party application.

20. The system of claim 15, wherein the stored security restrictions are applied to the user's session with the third-party application.

* * * * *